United States Patent
Jiang et al.

(10) Patent No.: US 12,467,851 B2
(45) Date of Patent: Nov. 11, 2025

(54) MONOCULAR HIGH-RESOLUTION MULTISPECTRAL IMAGING SYSTEM AND CONTROL METHOD

(71) Applicant: SOUTH CHINA AGRICULTURAL UNIVERSITY, Guangzhou (CN)

(72) Inventors: Rui Jiang, Guangzhou (CN); Yuanzhen Ou, Guangzhou (CN); Lijing Chen, Guangzhou (CN); Huanyu Wang, Guangzhou (CN); Jinghang Lei, Guangzhou (CN); Jianqin Lin, Guangzhou (CN); Zhiyan Zhou, Guangzhou (CN); Xiwen Luo, Guangzhou (CN)

(73) Assignee: SOUTH CHINA AGRICULTURAL UNIVERSITY, Guangzhou (CN)

( * ) Notice: Subject to any disclaimer, the term of this patent is extended or adjusted under 35 U.S.C. 154(b) by 0 days.

(21) Appl. No.: 19/068,065

(22) Filed: Mar. 3, 2025

(65) Prior Publication Data
US 2025/0305939 A1  Oct. 2, 2025

(30) Foreign Application Priority Data
Mar. 26, 2024 (CN) .......................... 202410345985.5

(51) Int. Cl.
*G01N 21/25* (2006.01)
*G01J 3/02* (2006.01)
(Continued)

(52) U.S. Cl.
CPC ............ *G01N 21/25* (2013.01); *G01J 3/0208* (2013.01); *G01J 3/0227* (2013.01); *G01N 21/55* (2013.01);
(Continued)

(58) Field of Classification Search
CPC ...... G01N 21/25; G01N 21/55; G01N 33/025; G01J 3/0208; G01J 3/0227; G01J 2003/2826
See application file for complete search history.

(56) References Cited

U.S. PATENT DOCUMENTS

2019/0236358 A1   8/2019  Tokumaru
2021/0310860 A1  10/2021  Takashima
(Continued)

FOREIGN PATENT DOCUMENTS

| CN | 104819941 | 8/2015 |
| CN | 115993609 | 4/2023 |

(Continued)

*Primary Examiner* — Hina F Ayub
(74) *Attorney, Agent, or Firm* — JMB Davis Ben-David

(57) ABSTRACT

Disclosed are a monocular high-resolution multispectral imaging system and a control method, relating to the technical field of vegetation index monitoring. The imaging system includes: an image sensor, configured to convert an optical signal of each waveband into a digital signal; a distortionless imaging lens, configured to focus an original image optical signal of a target object on the image sensor to generate a red-green-blue (RGB) original image; a multi-waveband combined narrow-band optical filter, placed between the distortionless imaging lens and the image sensor and configured to constrain a spectral range of an actual receivable optical signal of the image sensor; an incident light calibration module, configured to acquire incident irradiance of ambient light; and a parallel data processing unit, connected to the image sensor and configured to analyze the digital signal in combination with the incident irradiance and generate a reflectivity image for vegetation analysis. It is conducive to solving the problems of high cost as well as insufficient image synchronization and registration precision of existing multispectral sensors.

6 Claims, 2 Drawing Sheets

(51) Int. Cl.
*G01J 3/28* (2006.01)
*G01N 21/55* (2014.01)
*G01N 33/02* (2006.01)

(52) U.S. Cl.
CPC .... *G01N 33/025* (2013.01); *G01J 2003/2826* (2013.01)

(56) References Cited

U.S. PATENT DOCUMENTS

| | | | |
|---|---|---|---|
| 2021/0381893 A1 | 12/2021 | Balas | |
| 2023/0252625 A1* | 8/2023 | Nikolakakis | A01D 75/00 |
| | | | 382/110 |
| 2023/0353890 A1* | 11/2023 | Gimkiewicz | H04N 23/55 |
| 2024/0393235 A1* | 11/2024 | He | G06V 10/774 |

FOREIGN PATENT DOCUMENTS

| | | |
|---|---|---|
| CN | 118050328 | 5/2024 |
| JP | 2010122080 | 6/2010 |
| KR | 20220001154 | 1/2022 |

\* cited by examiner

MONOCULAR HIGH-RESOLUTION MULTISPECTRAL IMAGING SYSTEM AND CONTROL METHOD

CROSS REFERENCE TO RELATED APPLICATIONS

Benefit is claimed to Chinese Patent Application No. CN 202410345985.5, filed on Mar. 26, 2024, the contents of which are incorporated by reference herein in their entirety.

FIELD

The present disclosure relates to the technical field of vegetation index monitoring, and particularly to a monocular high-resolution multispectral imaging system and a control method.

BACKGROUND

The vegetation index (such as NDVI, SAVI, and EVI) is a marker that reflects the relative abundance and activity of green vegetation, a comprehensive representation of crop phenotypic parameters (chlorophyll, photosynthetic rate, water stress, biomass, salt tolerance, leaf water content, etc.), and an important basis for high-throughput phenotypic analysis of crop growth and yield assessment. The unmanned aerial vehicle acquires multispectral images with high spatial and temporal resolution by mounting multispectral sensors. After extracting the optical information of red (R), green (G), near infrared (NIR), and other typical wavebands in the multispectral images and performing digital analysis and standardized calculation, reflectivity images for guiding agricultural production may be obtained.

Currently, the multispectral sensors mounted on the unmanned aerial vehicle mainly include: multi-lens type, beam-splitting type, filter wheel type, and pixelated multispectral optical filter array type. In the related art of CN117190979A and WO2023034986A1, a multi-lens sensor is disclosed. The multi-lens sensor generally includes several cameras. Although it has high flexibility and customizability in waveband selection, the cost of the sensor increases significantly with the increase of the number of spectral channels. Moreover, it is difficult to control the physical image deviation of the same target caused by the multiple cameras. In the related art of CN102103265A and WO2023160429A1, a beam-splitting sensor is disclosed. The beam-splitting sensor separates a light ray from an object into beams of several wavebands using a plurality of optical splitters, which can effectively alleviate the problems of image capturing and image registration of the multi-lens sensor. However, the optical splitters tend to cause a loss of light intensity and reduce the signal-to-noise ratio of the multispectral images. In the related art of CN220085165U, CN219574500U, and CN219392445U, it is disclosed that multispectral images with full spatial resolution are captured by rotating a filter wheel, which has high waveband flexibility, but with the problems of slow imaging speed, difficult image registration, and high wear-and-tear of mechanical moving parts. In the related art of CN112840633A and WO2022190826A1, a preferred configuration of a compact multispectral sensor is disclosed. However, the cost of the optical filter is high, the mutual interference phenomenon of spectral wavebands is serious, the overall spectral sensitivity is low, and the image processing is difficult.

SUMMARY

The present disclosure aims to overcome at least one of the above-mentioned drawbacks of the related art and to provide a monocular high-resolution multispectral imaging system and a control method for solving the problems of high cost as well as insufficient image synchronization and registration precision of existing multispectral sensors.

The technical solution adopted by the present disclosure is a monocular high-resolution multispectral imaging system, including: an image sensor, configured to convert an optical signal of each waveband into a digital signal; a distortionless imaging lens, configured to focus an original image optical signal of a target object on the image sensor to generate a red-green-blue (RGB) original image; a multi-waveband combined narrow-band optical filter, placed between the distortionless imaging lens and the image sensor and configured to constrain a spectral range of an actual receivable optical signal of the image sensor; an incident light calibration module, configured to acquire incident irradiance of ambient light; and a parallel data processing unit, connected to the image sensor and configured to analyze the digital signal in combination with the incident irradiance and generate a reflectivity image for vegetation analysis.

DETAILED DESCRIPTION

Figure 1:
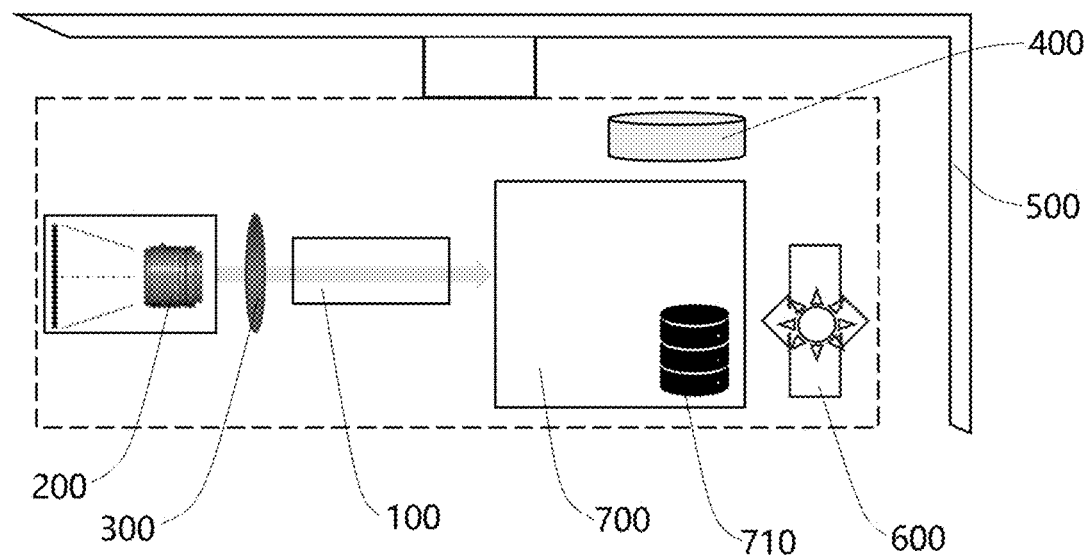
FIG. 1 is a schematic diagram of an imaging system of the present disclosure.

The imaging system further includes: a self-stabilizing gimbal, configured to control the distortionless imaging lens to be directed towards a shooting target in real time; a positioning module, configured to acquire shot geographical location information and a course angle; and a data storage device, configured to store the RGB original image, the geographical location information, and the course angle, where the distortionless imaging lens, the multi-waveband combined narrow-band optical filter, the image sensor, the incident light calibration module, the parallel data processing unit, the positioning module, and the data storage device are provided on the self-stabilizing gimbal; the positioning module is connected to the parallel data processing unit; and the coordinate center of the image sensor vertically coincides with a geometric center of the antenna of the positioning module.

The image sensor includes three channels of R, G, and B; let
- a response range of the R channel be $\lambda_R \in [A_s, A_e]$;
- a response range of the G channel be $\lambda_G \in [B_s, B_e]$;
- a response range of the B channel be $\lambda_B \in [C_s, C_e]$;
- an actual measured value of any channel is DN, where actual measured values of the R channel, G channel, and B channel are R_DN, G_DN, and B_DN, respectively;
- a response function of the R channel is $R\_DN = f_R(R_{\lambda_R})$;
- a response function of the G channel is $G\_DN = f_G(R_{\lambda_G})$;
- a response function of the B channel is $B\_DN = f_B(R_{\lambda_B})$, where $R_{\lambda_R}$, $R_{\lambda_G}$, and $R_{\lambda_B}$ are irradiance corresponding to $\lambda_R$, $\lambda_G$, and $\lambda_B$ wavelengths, respectively;
- the multi-waveband combined narrow-band optical filter is a three-waveband combined narrow-band optical filter; let central wavelengths of the three wavebands be $\lambda_a$, $\lambda_b$, and $\lambda_c$, respectively, and satisfy $\lambda_a<\lambda_b<\lambda_c$;

$R_{\lambda_a}$, $R_{\lambda_b}$, and $R_{\lambda_c}$ are irradiance corresponding to $\lambda_a$, $\lambda_b$, and $\lambda_c$, respectively.

When $R_{\lambda_a}=R_{\lambda_b}=R_{\lambda_c}$, the actual measured values of the R channel, G channel, and B channel in the image sensor satisfy:

$$f_R(R_{\lambda_a}) \leqslant f_R(R_{\lambda_c}) \leqslant f_R(R_{\lambda_b});$$

$$f_G(R_{\lambda_b}) \leqslant f_G(R_{\lambda_c}) \leqslant f_G(R_{\lambda_a});$$

$$f_B(R_{\lambda_b}) \leqslant f_B(R_{\lambda_a}) \leqslant f_B(R_{\lambda_c}).$$

Further, a control method of the imaging system is provided, including the steps of:
original image optical signal of the target object entering the distortionless imaging lens;
performing combined filtering on the original image optical signal using three-waveband combined narrow-band optical filter;
after the combined filtering, focusing filtered optical signals on the image sensor of the imaging system to generate a waveband-constrained RGB original image;
converting the waveband-constrained RGB original image into a digital signal, and acquiring actual irradiance corresponding to each waveband;
acquiring incident irradiance of ambient light, and acquiring spectral image reflectivity corresponding to each waveband through the incident irradiance and the acquired actual irradiance.

Before the step of "(1) original image optical signal of the target object entering the distortionless image lens", the control method further includes the steps of: calibrating the imaging system specifically as follows:
adjusting the field of view of the imaging system so that the field of view is completely within a standard reflector;
applying a uniform light source to the standard reflector and adjusting the illumination intensity, and continuously performing interval acquisition, by the imaging system, on the standard reflector to acquire a certain amount of RGB original images;
assuming the image resolution of the imaging system to be A×B and X to be coordinates of a pixel, X=[x, y], where x∈[1, A], y∈[1, B];
acquiring irradiance corresponding to pixels in each RGB original image;
acquiring an attenuation coefficient ax of each pixel through a difference in irradiance between a center and other pixels in each RGB original image;
training each pixel through the change of the certain amount of RGB original images, and setting a DN value corresponding to the center of the RGB original image to be $DN_p$ and a DN value corresponding to other pixels of the RGB original image to be $DN_X$; and
the attenuation coefficient of each pixel satisfying $$a_X = \frac{DN_X}{DN_p};$$

after the step of "(4) converting the waveband-constrained RGB original image into a digital signal", the control method further includes: performing correction on the pixels in the waveband-constrained RGB original image;

after correction, a DN value corresponding to other pixels except the center is $$DN_{RX}, DN_{RX} = \frac{DN_X}{a_X}.$$

The step of "2) applying a uniform light source to the standard reflector and adjusting the illumination intensity" is specifically as follows:
directing the standard reflector to the light source;
aligning the imaging system with the standard reflector; and
simulating a light environment actually used by the imaging system through a light source passing position and regular changes of brightness.

The combined filtering is specifically three-waveband combined filtering.

Central wavelengths of the wavebands in the combined filtering are $\lambda_a$, $\lambda_b$, and $\lambda_c$, respectively, and satisfy $\lambda_a<\lambda_b<\lambda_c$;
the image sensor includes the R channel, G channel, and B channel;
after the combined filtering, DN values of the waveband-constrained RGB original image received by the R channel, G channel, and B channel are R_DN, G_DN, and B_DN, respectively;
the irradiance corresponding to the central wavelengths of the wavebands $\lambda_a$, $\lambda_b$, and $\lambda_c$ are $R_{\lambda_a}$, $R_{\lambda_b}$, and $R_{\lambda_c}$, respectively;
the following relationships are required:

$$R\_DN = a_1 \times R_{\lambda_a} + a_2 \times R_{\lambda_b} + a_3 \times R_{\lambda_c};$$

$$G\_DN = b_1 \times R_{\lambda_a} + b_2 \times R_{\lambda_b} + b_3 \times R_{\lambda_c};$$

$$B\_DN = c_1 \times R_{\lambda_a} + c_2 \times R_{\lambda_b} + c_3 \times R_{\lambda_c};$$

that is:

$$\begin{bmatrix} R\_DN \\ G\_DN \\ B\_DN \end{bmatrix} = \begin{bmatrix} a_1 & a_2 & a_3 \\ b_1 & b_2 & b_3 \\ c_1 & c_2 & c_3 \end{bmatrix} \cdot \begin{bmatrix} R_{\lambda_a} \\ R_{\lambda_b} \\ R_{\lambda_c} \end{bmatrix},$$

wherein $a_1$, $a_2$, and $a_3$ are response coefficient factors of the R channel, $b_1$, $b_2$, and $b_3$ are response coefficient factors of the G channel, and $c_1$, $c_2$, and $c_3$ are response coefficient factors of the B channel;
a response coefficient factor matrix is acquired:

$$\begin{bmatrix} a_1 & a_2 & a_3 \\ b_1 & b_2 & b_3 \\ c_1 & c_2 & c_3 \end{bmatrix};$$

the step of "acquiring actual irradiance corresponding to each waveband" is specifically as follows: calculating $R_{\lambda_a}$, $R_{\lambda_b}$, and $R_{\lambda_c}$ by the response coefficient factor matrix and R_DN, G_DN, and B_DN.

The step of "a response coefficient factor matrix is acquired" is specifically as follows:
after the steps of "(1) original image optical signal of the target object entering the distortionless imaging lens" and "(2) performing combined filtering on the original image optical signal using three-waveband combined narrow-band optical filter", adding three single-waveband filters in front of the three-waveband combined narrow-band optical filter in sequence, and the central wavelength of single-waveband filter is consistent with one of the wavelengths of three-waveband combined narrow-band optical filter;

in the single-waveband filters, let the central wavelengths of the adopted wavebands be $\lambda_{sa}$, $\lambda_{sb}$, and $\lambda_{sc}$, respectively, and satisfy $\lambda_{sa}=\lambda_a$, $\lambda_{sb}=\lambda_b$, and $\lambda_{sc}=\lambda_c$;

when only the single-waveband filter with the central wavelength of $\lambda_{sa}$ is added:

$$a_1 = \frac{R\_DN}{R_{\lambda_a}}; b_1 = \frac{G\_DN}{R_{\lambda_a}}; c_1 = \frac{B\_DN}{R_{\lambda_a}};$$

when only the single-waveband filter with the central wavelength of $\lambda_{sb}$ is added:

$$a_2 = \frac{R\_DN}{R_{\lambda_b}}; b_2 = \frac{G\_DN}{R_{\lambda_b}}; c_2 = \frac{B\_DN}{R_{\lambda_b}};$$

when only the single-waveband filter with the central wavelength of $\lambda_{sc}$ is added:

$$a_3 = \frac{R\_DN}{R_{\lambda_c}}; b_3 = \frac{G\_DN}{R_{\lambda_c}}; c_3 = \frac{B\_DN}{R_{\lambda_c}};$$

the response coefficient factor matrix is thus acquired.

The step of "(5) acquiring incident irradiance of ambient light, . . . " is specifically as follows:

acquiring the incident irradiance of the ambient light using an incident light calibration module;

the incident light calibration module includes three spectral channels, and central wavelengths of the three spectral channels are $\lambda_{ka}$, $\lambda_{kb}$, and $\lambda_{kc}$, respectively, and satisfy: $\lambda_{ka}=\lambda_a$, $\lambda_{kb}=\lambda_b$, and $\lambda_{kc}=\lambda_c$.

$V_{out\_in}$ is an output voltage of the spectral channel. $R_e$ is the sensitivity of a photosensitive element corresponding to a specific wavelength, $R_{e\_in}$ is the incident irradiance of the spectral channel, and $t_{in}$ is the integration time. The incident irradiance $R_{e\_in}$ of the three spectral channels of the incident light calibration module is acquired by the following equation:

$$R_{e\_in} = \frac{V_{out\_in}}{R_e \times t_{in}}.$$

The step of "(5) . . . , acquiring spectral image reflectivity corresponding to each waveband through the incident irradiance and the acquired actual irradiance" is specifically as follows:

setting spectral image reflectivities corresponding to $\lambda_a$, $\lambda_b$, and $\lambda_c$ to be $REF_{\lambda_a}$, $REF_{\lambda_b}$, and $REF_{\lambda_c}$, and obtaining the spectral image reflectivities by the following equations:

$$REF_{\lambda_a} = \frac{R_{\lambda_a}}{R_{e\_in\_\lambda_a}}; REF_{\lambda_b} = \frac{R_{\lambda_b}}{R_{e\_in\_\lambda_b}}; REF_{\lambda_c} = \frac{R_{\lambda_c}}{R_{e\_in\_\lambda_c}}.$$

Compared with the related art, the beneficial effects of the present disclosure are as follows. The monocular high-resolution multispectral imaging system proposed by the present disclosure has lower cost, a smaller physical offset of remote sensing image data, better exposure position consistency, and faster splicing calibration than the traditional multi-lens multispectral sensor. It is more suitable for mounting on a small unmanned aerial vehicle platform. The large field-of-view lens improves the acquisition efficiency of remote sensing images and helps optimize the flight path of the unmanned aerial vehicle, effectively reducing the amount of image data and the need for data storage.

The control method proposed in the present disclosure achieves synchronous accurate acquisition of crop multi-waveband spectral images by the imaging system. Compared with the acquisition of single-waveband spectral images using multiple lenses in the traditional imaging system, the control method of the present disclosure requires a small amount of image data, solves the complex alignment problem in multi-image unification, and realizes the accurate acquisition of three spectra (R, G, and NIR) of a single image. Data of each narrow-band spectrum in the RGB original image can be accurately extracted through the constraint decomposition to generate the reflected image required for analysis, realizing the effective monitoring of crop growth.

The combined narrow-band filtering proposed in the present disclosure is flexible in the selection of the center wavelength and can be fully matched by selecting different spectral wavebands according to the crop growth monitoring needs, such as different crop species, sensing sites, and stress from pests, diseases, and weeds, so as to make it applicable to a variety of scenarios of crop production. It plays an important role in decision support and application based on unmanned aerial vehicle remote sensing monitoring and stress analysis.

Description of reference numerals shown in the drawings: 100—image sensor, 200—distortionless imaging lens, 300—multi-waveband combined narrow-band optical filter, 400—incident light calibration module, 500—self-stabilizing gimbal, 600—positioning module, 700—parallel data processing unit, and 710—data storage device.

EMBODIMENTS

The accompanying drawings of the present disclosure are for exemplary illustration only and are not to be construed as a limitation of the present disclosure. In order to better illustrate the following embodiments, some parts of the drawings may be omitted, enlarged, or reduced in size and do not represent actual product dimensions. It will be appreciated by a person skilled in the art that some well-known structures and descriptions thereof may be omitted from the figures.

Embodiment 1

This embodiment is a monocular high-resolution multispectral imaging system, as shown in FIG. 1, including: an image sensor 100, configured to convert an optical signal of each waveband into a digital signal; a distortionless imaging lens 200, configured to focus an original image optical signal of a target object on the image sensor 100 to generate an RGB original image; a multi-waveband combined narrow-band optical filter 300, placed between the distortionless imaging lens 200 and the image sensor 100 and configured to constrain a spectral range of an actual receivable optical signal of the image sensor 100; an incident light calibration module 400, configured to acquire incident irradiance of ambient light; and a parallel data processing unit 700, connected to the image sensor 100 and configured to analyze the digital signal in combination with the incident irradiance and generate a reflectivity image for vegetation analysis.

The multi-waveband combined narrow-band optical filter 300 combined with the image sensor 100 has the features of compact and light structure, lower manufacturing cost, and more suitable for limited load platforms such as small unmanned aerial vehicles. Meanwhile, because a plurality of waveband data is acquired by the same optical path, the geometric correction and radiation correction between wavebands are relatively easier, the loss of light intensity is smaller, and the image synchronization and image registration precision of the wavebands are higher. The multi-waveband combined narrow-band optical filter 300 effectively realizes the high-efficiency constraint on the required waveband of the original image optical signal with mixed spectrum. Then, the RGB original image of a selected specific waveband combination is decomposed by the parallel data processing unit 700, thereby simplifying the overall structure and reducing the cost. In addition, the accurate perception of crop multispectral information by the monocular high-resolution multispectral imaging system is realized. Preferably, the image sensor 100 may adopt a high-resolution global shutter image sensor. The parallel data processing unit may adopt a high-speed parallel data processing unit 700. In this embodiment, the image sensor 100 is a CMOS image sensor. The high-speed parallel data processing unit 700 is a field-programmable gate array (FPGA). The high-speed parallel data processing unit 700 can process the RGB original image captured by a high-resolution global shutter image sensor.

As shown in FIG. 1, the imaging system further includes: a self-stabilizing gimbal 500, configured to control the distortionless imaging lens 200 to be directed towards a shooting target in real time; a positioning module 600, configured to acquire shot geographical location information and a course angle; and a data storage device 710, configured to store the RGB original image, the geographical location information, and the course angle. The distortionless imaging lens 200, the multi-waveband combined narrow-band optical filter 300, the image sensor 100, the incident light calibration module 400, the parallel data processing unit 700, the positioning module 600, and the data storage device 710 are provided on the self-stabilizing gimbal 500.

The positioning module 600 is connected to the parallel data processing unit 700. A coordinate center of the image sensor 100 vertically coincides with a geometric center of an antenna of the positioning module 600.

The geographical location information includes: latitude coordinate, longitude coordinate, and altitude. In this embodiment, the positioning module 600 can provide a clock signal, and the clock signal can trigger the parallel data processing unit 700 and synchronously control the image sensor 100 and the incident light calibration module 400, thereby realizing synchronous acquisition of positioning signal, illumination signal, and RGB original image.

The self-stabilizing gimbal 500 enables the monocular high-resolution multispectral imaging system to always be in an orthophoto ground state under different motion gestures, so as to ensure that the acquired spectral image data is in an orthophoto correspondence with the geographical coordinate data. The spectral image data is acquired periodically and equidistantly through time information and longitude-latitude information of the high-precision positioning module 600.

The image sensor 100 includes three channels of R, G, and B.

Let a response range of the R channel be $\lambda_R \in [A_s, A_e]$;

a response range of the G channel be $\lambda_G \in [B_s, B_e]$;

a response range of the B channel be $\lambda_B \in [C_s, C_e]$.

An actual measured value of any channel is DN, where actual measured values of the R channel, G channel, and B channel are R_DN, G_DN, and B_DN, respectively.

A response function of the R channel is $R\_DN = f_R(R_{\lambda_R})$;

a response function of the G channel is $G\_DN = f_G(R_{\lambda_G})$;

a response function of the B channel is $B\_DN = f_B(R_{\lambda_B})$, where $R_{\lambda_R}$, $R_{\lambda_G}$, and $R_{\lambda_B}$ are irradiance corresponding to $\lambda_R$, $\lambda_G$, and $\lambda_B$ wavelengths, respectively.

Figure 2:
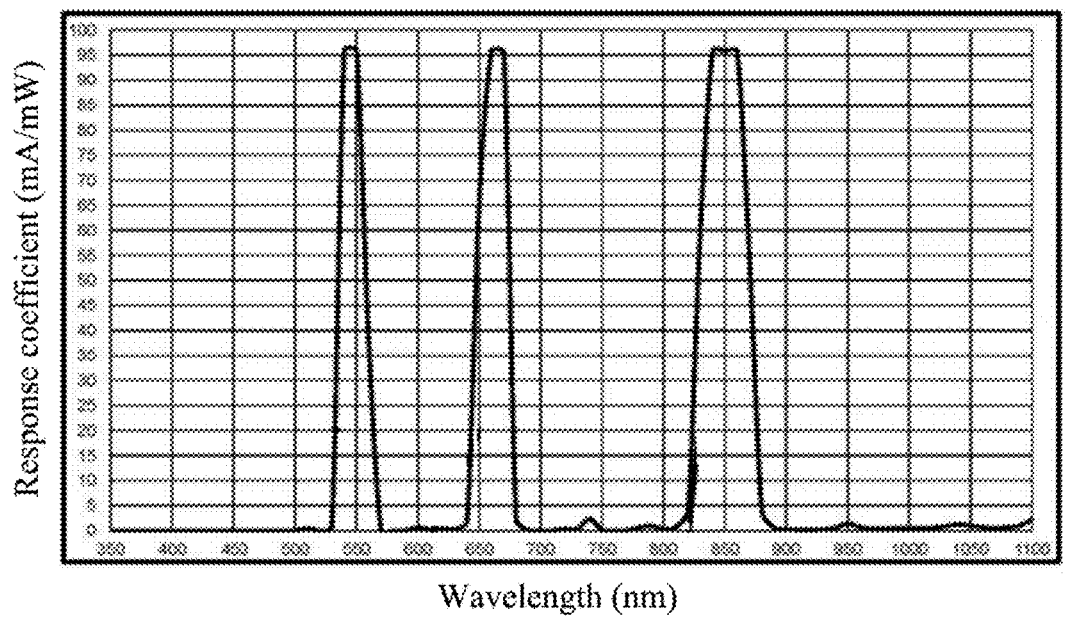
FIG. 2 is a parametric diagram of a three-waveband combined narrow-band optical filter of the present disclosure.

The multi-waveband combined narrow-band optical filter 300 is a three-waveband combined narrow-band optical filter. Let central wavelengths of the three wavebands be $\lambda_a$, $\lambda_b$, and $\lambda_c$, respectively. As shown in FIG. 2, the three-waveband combined narrow-band optical filter satisfies $\lambda_a < \lambda_b < \lambda_c$.

$R_{\lambda_a}$, $R_{\lambda_b}$, and $R_{\lambda_c}$ are irradiance corresponding to $\lambda_a$, $\lambda_b$, and $\lambda_c$, respectively. When $R_{\lambda_a} = R_{\lambda_b} = R_{\lambda_c}$, the actual measured values of the R channel, G channel, and B channel in the image sensor 100 satisfy:

$$f_R(R_{\lambda_a}) \leqslant f_R(R_{\lambda_c}) \leqslant f_R(R_{\lambda_b});$$

$$f_G(R_{\lambda_b}) \leqslant f_G(R_{\lambda_c}) \leqslant f_G(R_{\lambda_a});$$

$$f_B(R_{\lambda_b}) \leqslant f_B(R_{\lambda_a}) \leqslant f_B(R_{\lambda_c}).$$

In this embodiment, $\lambda_R$, $\lambda_G$, and $\lambda_B$ are in nm, and $R_{\lambda_R}$, $R_{\lambda_G}$, and $R_{\lambda_B}$ are in w/m². $\lambda_R \in [600, 700]$, $\lambda_G \in [500, 600]$, $\lambda_B \in [400, 500]$.

The image sensor 100 responds to red light through the R channel, green light through the G channel, and near-infrared light through the B channel, and the three channels independently and accurately respond to spectral wavebands in the three-waveband combined narrow-band optical filter, thereby realizing the accurate perception of the multispectral phenotypic parameter information of the target object (green vegetation) by the monocular high-resolution multispectral imaging system.

Embodiment 2

Figure 3:
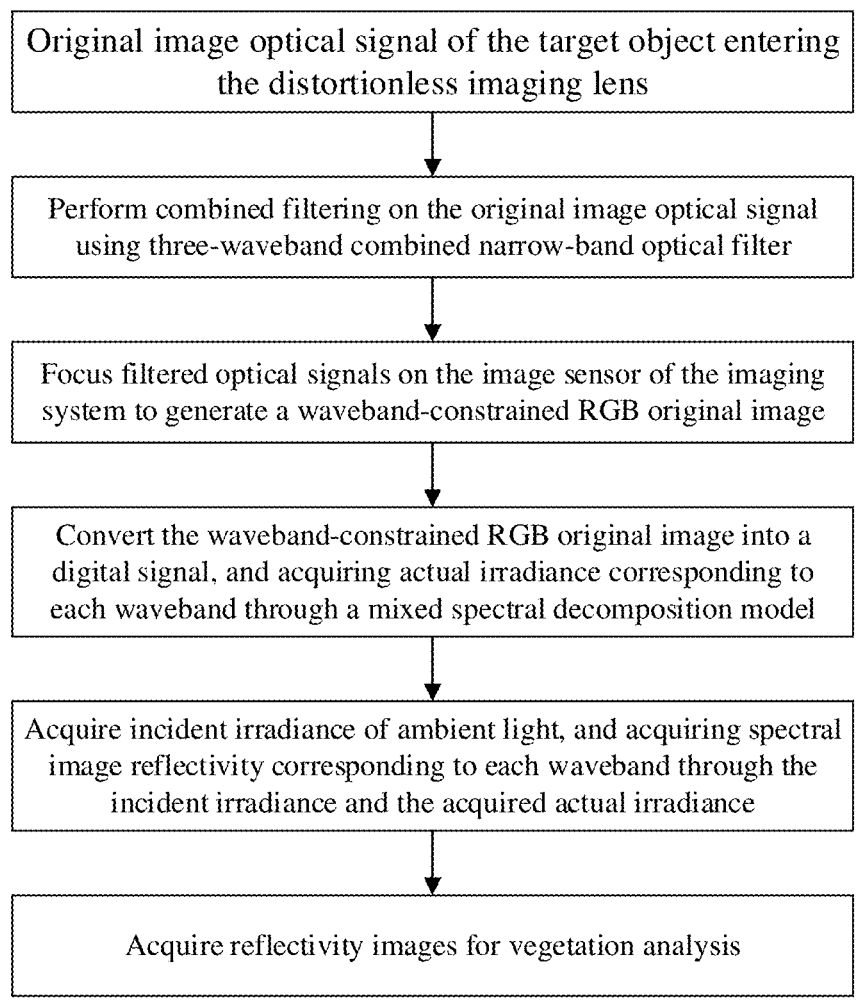
FIG. 3 is a flowchart of a control method of the present disclosure.

As shown in FIG. 3, this embodiment is a control method of the imaging system, including the steps of:

original image optical signal of the target object entering the distortionless imaging lens;

performing combined filtering on the original image optical signal using three-waveband combined narrow-band optical filter;

after the combined filtering, focusing filtered optical signals on the image sensor of the imaging system to generate a waveband-constrained RGB original image;

converting the waveband-constrained RGB original image into a digital signal, and acquiring actual irradiance corresponding to each waveband; and acquiring incident irradiance of ambient light, and acquiring spectral image reflectivity corresponding to each waveband through the incident irradiance and the acquired actual irradiance; acquiring the reflectivity images for vegetation analysis.

Before the step of "(1) original image optical signal of the target object entering the distortionless imaging lens", the control method further includes the steps of: calibrating the imaging system specifically as follows:

adjusting the field of view of the imaging system so that the field of view is completely within a standard reflector;

applying a uniform light source to the standard reflector and adjusting the illumination intensity, and continuously performing interval acquisition, by the imaging system, on the standard reflector to acquire a certain amount of RGB original images;

assuming the image resolution of the imaging system to be A×B and X to be coordinates of a pixel, X=[x, y], wherein x∈[1, A], y∈[1, B];

acquiring irradiance corresponding to pixels in each RGB original image;

acquiring an attenuation coefficient ax of each pixel through a difference in irradiance between a center and other pixels in each RGB original image;

training each pixel through the change of the certain amount of RGB original images, and setting a DN value corresponding to the center of the RGB original image to be $DN_p$ and a DN value corresponding to other pixels of the RGB original image to be $DN_X$; and the attenuation coefficient of each pixel satisfying $$a_X = \frac{DN_X}{DN_p};$$

after the step of "(4) converting the waveband-constrained RGB original image into a digital signal", the control method further includes: performing correction on the pixels in the waveband-constrained RGB original image;

after correction, a DN value corresponding to the irradiance of other pixels except the center is $$DN_{RX}, DN_{RX} = \frac{DN_X}{a_X}.$$

Due to the inherent cosine characteristic of the imaging system, the central irradiance of the original image optical signal is the highest, and the irradiance of other positions away from the center is attenuated to different degrees under the influence of the cosine characteristic. The actual irradiance of each pixel can be restored by the correction of the irradiance.

The step of "2) applying a uniform light source to the standard reflector and adjusting the illumination intensity" is specifically as follows:

directing the standard reflector to the light source;
aligning the imaging system with the standard reflector during orthophoto; and
simulating a light environment actually used by the imaging system through a light source passing position and regular changes of brightness.

In this embodiment, directing the standard reflector to the light source is specifically as follows: placing the standard reflector horizontally, and aligning the imaging system with the standard reflector during orthophoto. The light environment actually used by the imaging system is simulated through the light source passing position and regular changes of brightness, and the light environment from sunrise to sunset in a clear sky may be specifically adopted.

The combined filtering is specifically three-waveband combined filtering.

Central wavelengths of the wavebands in the combined filtering are $\lambda_a$, $\lambda_b$, and $\lambda_c$, respectively, and satisfy $\lambda_a < \lambda_b < \lambda_c$;

the image sensor includes the R channel, G channel, and B channel;

after the combined filtering, DN values of the waveband-constrained RGB original image received by the R channel, G channel, and B channel are R_DN, G_DN, and B_DN, respectively;

the irradiance corresponding to the central wavelengths of the wavebands $\lambda_a$, $\lambda_b$, and $\lambda_c$ are $R_{\lambda_a}$, $R_{\lambda_b}$, and $R_{\lambda_c}$, respectively;

the following relationships are required:

$$R\_DN = a_1 \times R_{\lambda_a} + a_2 \times R_{\lambda_b} + a_3 \times R_{\lambda_c};$$

$$G\_DN = b_1 \times R_{\lambda_a} + b_2 \times R_{\lambda_b} + b_3 \times R_{\lambda_c};$$

$$B\_DN = c_1 \times R_{\lambda_a} + c_2 \times R_{\lambda_b} + c_3 \times R_{\lambda_c};$$

that is:

$$\begin{bmatrix} R\_DN \\ G\_DN \\ B\_DN \end{bmatrix} = \begin{bmatrix} a_1 & a_2 & a_3 \\ b_1 & b_2 & b_3 \\ c_1 & c_2 & c_3 \end{bmatrix} \cdot \begin{bmatrix} R_{\lambda_a} \\ R_{\lambda_b} \\ R_{\lambda_c} \end{bmatrix},$$

wherein $a_1$, $a_2$, and $a_3$ are response coefficient factors of the R channel, $b_1$, $b_2$, and $b_3$ are response coefficient factors of the G channel, and $c_1$, $c_2$, and $c_3$ are response coefficient factors of the B channel;

a response coefficient factor matrix is acquired:

$$\begin{bmatrix} a_1 & a_2 & a_3 \\ b_1 & b_2 & b_3 \\ c_1 & c_2 & c_3 \end{bmatrix};$$

the step of "acquiring actual irradiance corresponding to each waveband" is specifically as follows: calculating $R_{\lambda_a}$, $R_{\lambda_b}$, and $R_{\lambda_c}$ by the response coefficient factor matrix and R_DN, G_DN, and B_DN.

Although the three-waveband combined filtering forms the waveband control and constraint for multispectral images, it cannot avoid that the image sensor has a certain degree of response to the radiation amount of the same waveband due to the inherent channels (R, G, B), which makes it difficult to accurately acquire the irradiance components of sensitive wavebands R, G, NIR (B) of the target object, resulting in obvious spectral data mutual interference problem, reducing the measurement accuracy of the spectral wavebands, thus causing a large deviation in the vegetation index monitoring, and affecting the reliability of data. Under the action of the response coefficient factor matrix, the decomposition of irradiance between different spectral wavebands is realized, and the mutual interference of irradiance between different spectral wavebands is eliminated. Further, R, G, and B in the multispectral image are obtained. The accurate response of imaging to each spectral waveband is realized, providing a new idea of low-cost, high-resolution, and narrow-waveband digital perception for acquiring reflectivity images of target objects (green crops) and studying multispectral phenotypic parameters.

After the steps of "(1) original image optical signal of the target object entering the distortionless imaging lens" and "(2) performing combined filtering on the original image optical signal using three-waveband combined narrow-band optical filter", adding three single-waveband filters in front of the three-waveband combined narrow-band optical filter in sequence, and the central wavelength of single-waveband filter is consistent with one of the wavelengths of three-waveband combined narrow-band optical filter;

in the single-waveband filters, let the central wavelengths of the adopted wavebands be $\lambda_{sa}$, $\lambda_{sb}$, and $\lambda_{sc}$, respectively, and satisfy $\lambda_{sa}=\lambda_a$, $\lambda_{sb}=\lambda_b$, and $\lambda_{sc}=\lambda_c$;

when only the single-waveband filter with the central wavelength of $\lambda_{sa}$ is added:

$$a_1 = \frac{R\_DN}{R_{\lambda_a}}; b_1 = \frac{G\_DN}{R_{\lambda_a}}; c_1 = \frac{B\_DN}{R_{\lambda_a}};$$

when only the single-waveband filter with the central wavelength of $\lambda_{sb}$ is added:

$$a_2 = \frac{R\_DN}{R_{\lambda_b}}; b_2 = \frac{G\_DN}{R_{\lambda_b}}; c_2 = \frac{B\_DN}{R_{\lambda_b}};$$

when only the single-waveband filter with the central wavelength of $\lambda_{sc}$ is added:

$$a_3 = \frac{R\_DN}{R_{\lambda_c}}; b_3 = \frac{G\_DN}{R_{\lambda_c}}; c_3 = \frac{B\_DN}{R_{\lambda_c}};$$

the response coefficient factor matrix is thus acquired.

The step of "(5) acquiring incident irradiance of ambient light, . . . " is specifically as follows:

acquiring the incident illumination of the ambient light using an incident light calibration module;

the incident light calibration module includes three spectral channels, and central wavelengths of the three spectral channels are $\lambda_{ka}$, $\lambda_{kb}$, and $\lambda_{kc}$, respectively, and satisfy:

$\lambda_{ka}=\lambda_a, \lambda_{kb}=\lambda_b, \lambda_{kc}=\lambda_c$;

let $V_{out\_in}$ be an output voltage of the spectral channel, $R_e$ be the sensitivity of a photosensitive element corresponding to a specific wavelength, $R_{e\_in}$ be the incident light irradiance of the spectral channel, and $t_{in}$ be the integration time;

the incident light irradiance $R_{e\_in}$ of the three spectral channels of the incident light calibration module is acquired by the following equation:

$$R_{e\_in} = \frac{V_{out\_in}}{R_e \times t_{in}}.$$

$V_{out_{in}}$ is in V, $R_e$ is in V/(μJ/cm$^2$), $R_{e_{in}}$ is in μJ/cm$^2$, and $t_{in}$ is in s.

The step of "(5) . . . , acquiring spectral image reflectivity corresponding to each waveband through the incident irradiance and the acquired actual irradiance" is specifically as follows:

setting spectral image reflectivities corresponding to $\lambda_a$, $\lambda_b$, and $\lambda_c$ to be $REF_{\lambda_a}$, $REF_{\lambda_b}$, and $REF_{\lambda_c}$, and obtaining the spectral image reflectivities by the following equations:

$$REF_{\lambda_a} = \frac{R_{\lambda_a}}{R_{e\_in\_\lambda_a}}; REF_{\lambda_b} = \frac{R_{\lambda_b}}{R_{e\_in\_\lambda_b}}; REF_{\lambda_c} = \frac{R_{\lambda_c}}{R_{e\_in\_\lambda_c}}.$$

Embodiment 3

A control method of the imaging system is provided, including the steps of:
(1) original image optical signal of the target object entering the distortionless imaging lens;
(2) performing combined filtering on the original image optical signal using three-waveband combined narrow-band optical filter;
(3) after the combined filtering, focusing filtered optical signals on the image sensor of the imaging system to generate a waveband-constrained RGB original image;
(4) converting the waveband-constrained RGB original image into a digital signal, and acquiring actual irradiance corresponding to each waveband; and
(5) acquiring incident irradiance of ambient light, and acquiring spectral image reflectivity corresponding to each waveband through the incident irradiance and the acquired actual irradiance; acquiring the reflectivity images for vegetation analysis.

In this embodiment, the original image optical signal of the target object is acquired through a distortionless imaging lens 200. The combined filtering is performed on the original image optical signal through the three-waveband combined narrow-band optical filter. After the combined filtering, focusing filtered optical signals on the image sensor 100 of the imaging system to generate a waveband-constrained RGB original image and then converting the waveband-constrained RGB original image into a digital signal. The actual irradiance corresponding to each waveband is acquired through the parallel data processing unit 700. The incident irradiance of the ambient light is acquired by acquiring the actual irradiance corresponding to each waveband. The parallel data processing unit 700 analyzes the spectral image reflectivity to generate the reflectivity image.

Before the step of "(1) original image optical signal of the target object entering the distortionless imaging lens", the control method further includes the steps of: calibrating the imaging system specifically as follows:
adjusting the field of view of the imaging system so that the field of view is completely within a standard reflector;
applying a uniform light source to the standard reflector and adjusting the illumination intensity, and continuously performing interval acquisition, by the imaging system, on the standard reflector to acquire a certain amount of RGB original images;
assuming the image resolution of the imaging system to be A×B and X to be coordinates of a pixel, X=[x, y], where x∈[1, A], y∈[1, B];
acquiring irradiance corresponding to pixels in each RGB original image;
acquiring an attenuation coefficient ax of each pixel through a difference in irradiance between a center and other pixels in each RGB original image;
training each pixel through the change of the certain amount of RGB original images, and setting a DN value corresponding to the center of the RGB original image to be $DN_p$ and a DN value corresponding to other pixels of the RGB original image to be $DN_X$; and
the attenuation coefficient of each pixel satisfying $$a_X = \frac{DN_X}{DN_p};$$

after the step of "(4) converting the waveband-constrained RGB original image into a digital signal", the control method further includes: performing correction on the pixels in the waveband-constrained RGB original image;

after correction, a DN value corresponding to the irradiance of other pixels except the center is $$DN_{RX}, DN_{RX} = \frac{DN_X}{a_X}.$$

In this embodiment, the standard reflector is a Lambertian total reflecting plate. Due to the inherent cosine characteristic of the distortionless imaging lens 200, the central irradiance of the original image optical signal is the highest, and the irradiance of other positions away from the center is attenuated to different degrees under the influence of the cosine characteristic. The actual irradiance of each pixel can be restored by the correction of the irradiance.

The cosine correction is performed on the imaging system through the standard reflector. After the training, the attenuation coefficients of all pixel bits of the RGB original image may be obtained according to the equation. The value of $DN_{RX}$ is calculated through $$DN_{RX} = \frac{DN_X}{a_X}$$

in the process or actual remote sensing data acquisition. Since an optical structure in the imaging system is fixed, the above-mentioned model needs to be calibrated only once in the design process.

Let the coordinates of the lowest left corner of the RGB original image be the origin, and the origin coordinates are [1,1]. The irradiance $DN_p$ of the center of the RGB original image is a mean value of $DN_X$ corresponding to four pixels with pixel coordinates of $$\left[\frac{A}{2}, \frac{B}{2}\right], \left[\frac{A}{2}+1, \frac{B}{2}+1\right], \left[\frac{A}{2}+1, \frac{B}{2}\right], \text{ and } \left[\frac{A}{2}, \frac{B}{2}+1\right].$$

Adjusting the field of view of the imaging system so that the field of view is completely within the standard reflector is specifically as follows: adjusting the position and height of the imaging system to ensure that its field of view is completely contained by the standard reflector. The continuously performing interval acquisition is specifically performing continuous acquisition at fixed intervals. The actual image resolution of the RGB original image in this embodiment is 4,000×3,000. $DN_p$ is the mean value of DN of four pixels, [2000,1500], [2001,1501], [2001,1500], and [2000, 1501].

The imaging system acquires the original image optical signal of the mixed spectrum through the distortionless imaging lens 200, performs the combined filtering on the original image optical signal through the multi-waveband combined narrow-band optical filter 300, performs waveband constraint of the optical signal before entering the image sensor 100, and then converts the optical signal into the digital signal in the image sensor 100 to generate the RGB original image. The multispectral RGB original image is decomposed through the parallel data processing unit 700, and the independent response components corresponding to the central wavelengths in the R channel, G channel, and B channel of the image sensor are extracted.

The step of "applying a uniform light source to the standard reflector and adjusting the illumination intensity" is specifically as follows:

directing the standard reflector to the light source;

aligning the imaging system with the standard reflector during orthophoto; and simulating a light environment actually used by the imaging system through a light source passing position and regular changes of brightness.

In this embodiment, directing the standard reflector to the light source is specifically as follows: placing the standard reflector horizontally, and aligning the imaging system with the standard reflector during orthophoto. The light environment actually used by the imaging system is simulated through the light source passing position and regular changes of brightness, and the light environment from sunrise to sunset in a clear sky may be specifically adopted.

The combined filtering is specifically three-waveband combined filtering.

Central wavelengths of the wavebands in the combined filtering are $\lambda_a$, $\lambda_b$, and $\lambda_c$, respectively, and satisfy $\lambda_a<\lambda_b<\lambda_c$;

the image sensor includes the R channel, G channel, and B channel;

after the combined filtering, DN values of the waveband-constrained RGB original image received by the R channel, G channel, and B channel are R_DN, G_DN, and B_DN, respectively;

the irradiance corresponding to the central wavelengths of the wavebands $\lambda_a$, $\lambda_b$, and $\lambda_c$ are $R_{\lambda_a}$, $R_{\lambda_b}$, and $R_{\lambda_c}$, respectively;

the following relationships are required:

$R\_DN = a_1 \lambda R_{\lambda_a} + a_2 \times R_{\lambda_b} + a_3 \times R_{\lambda_c}$;

$G\_DN = b_1 \times R_{\lambda_a} + b_2 \times R_{\lambda_b} + b_3 \times R_{\lambda_c}$;

$B\_DN = c_1 \times R_{\lambda_a} + c_2 \times R_{\lambda_b} + c_3 \times R_{\lambda_c}$;

that is:

$$\begin{bmatrix} R\_DN \\ G\_DN \\ B\_DN \end{bmatrix} = \begin{bmatrix} a_1 & a_2 & a_3 \\ b_1 & b_2 & b_3 \\ c_1 & c_2 & c_3 \end{bmatrix} \cdot \begin{bmatrix} R_{\lambda_a} \\ R_{\lambda_b} \\ R_{\lambda_c} \end{bmatrix},$$

wherein $a_1$, $a_2$, and $a_3$ are response coefficient factors of the R channel, $b_1$, $b_2$, and $b_3$ are response coefficient factors of the G channel, and $c_1$, $c_2$, and $c_3$ are response coefficient factors of the B channel;

a response coefficient factor matrix is acquired:

$$\begin{bmatrix} a_1 & a_2 & a_3 \\ b_1 & b_2 & b_3 \\ c_1 & c_2 & c_3 \end{bmatrix};$$

the step of "acquiring actual irradiance corresponding to each waveband" is specifically as follows: calculating $R_{\lambda_a}$, $R_{\lambda_b}$, and $R_{\lambda_c}$ by the response coefficient factor matrix and R_DN, G_DN, and B_DN.

The step of "a response coefficient factor matrix is acquired" is specifically as follows:

after the steps of "(1) original image optical signal of the target object entering the distortionless imaging lens" and "(2) performing combined filtering on the original image optical signal using three-waveband combined narrow-band optical filter", adding three single-waveband filters in front of the three-waveband combined narrow-band optical filter in sequence, and the central wavelength of single-waveband filter is consistent with one of the wavelengths of three-waveband combined narrow-band optical filter;

in the single-waveband filters, let the central wavelengths of the adopted wavebands be $\lambda_{sa}$, $\lambda_{sb}$, and $\lambda_{sc}$, respectively, and satisfy $\lambda_{sa}=\lambda_a$, $\lambda_{sb}=\lambda_b$, and $\lambda_{sc}=\lambda_c$;

when only the single-waveband filter with the central wavelength of $\lambda_{sa}$ is added:

$$a_1 = \frac{R\_DN}{R_{\lambda_a}}; b_1 = \frac{G\_DN}{R_{\lambda_a}}; c_1 = \frac{B\_DN}{R_{\lambda_a}};$$

when only the single-waveband filter with the central wavelength of $\lambda_{sb}$ is added:

$$a_2 = \frac{R\_DN}{R_{\lambda_b}}; b_2 = \frac{G\_DN}{R_{\lambda_b}}; c_2 = \frac{B\_DN}{R_{\lambda_b}};$$

when only the single-waveband filter with the central wavelength of $\lambda_{sc}$ is added:

$$a_3 = \frac{R\_DN}{R_{\lambda_c}}; b_3 = \frac{G\_DN}{R_{\lambda_c}}; c_3 = \frac{B\_DN}{R_{\lambda_c}};$$

the response coefficient factor matrix is thus acquired.

The step of "(5) acquiring incident irradiance of ambient light, . . . " is specifically as follows:

acquiring the incident illumination of the ambient light using an incident light calibration module;

the incident light calibration module includes three spectral channels, and central wavelengths of the three spectral channels are $\lambda_{ka}$, $\lambda_{kb}$, and $\lambda_{kc}$, respectively, and satisfy:

$\lambda_{ka}=\lambda_a, \lambda_{kb}=\lambda_b, \lambda_{kc}=\lambda_c$;

let $V_{out\_in}$ be an output voltage of the spectral channel, $R_e$ be the sensitivity of a photosensitive element corresponding to a specific wavelength, $R_{e\_in}$ be the incident light irradiance of the spectral channel, and $t_{in}$ be the integration time;

the incident light irradiance $R_{e\_in}$ of the three spectral channels of the incident light calibration module is acquired by the following equation:

$$R_{e\_in} = \frac{V_{out\_in}}{R_e \times t_{in}}.$$

$V_{out_{in}}$ is in V, $R_e$ is in V/(μJ/cm$^2$), $R_{e_{in}}$ is in μJ/cm$^2$, and $t_{in}$ is in s.

In this embodiment, $\lambda_{ka}=\lambda_a=\lambda_{sa}=515$ nm;

$\lambda_{kb}=\lambda_b=\lambda_{sb}=650$ nm;

$\lambda_{kc}=\lambda_c=\lambda_{sc}=850$ nm.

$R_e$ is a constant, and the incident light calibration module 400 may determine the value of the ambient incident light irradiance $R_{e\_in}$ of any spectral channel from $\lambda_{ka}$, $\lambda_{kb}$, and $\lambda_{kc}$ according to $V_{out\_in}$ and $t_{in}$ when acquiring the ambient light. After performing the combined filtering on the irradiance of the three wavebands of the original image optical signal through the three-waveband combined narrow-band optical filter, the irradiance of the wavebands of 515 nm, 650 nm, and 850 nm received by R_DN, G_DN, and B_DN corresponding to DN has a certain degree of response, and the irradiance is set to be $R_{515}$, $R_{650}$, and $R_{850}$, respectively. The response relationship is as follows:

$$\begin{bmatrix} R\_DN \\ G\_DN \\ B\_DN \end{bmatrix} = \begin{bmatrix} a_1 & a_2 & a_3 \\ b_1 & b_2 & b_3 \\ c_1 & c_2 & c_3 \end{bmatrix} \cdot \begin{bmatrix} R_{515} \\ R_{650} \\ R_{850} \end{bmatrix}.$$

The single-waveband narrow-band optical filters with wavebands of 515 nm, 650 nm, and 850 nm are separately placed in front of the lens of the imaging system, and the separate corresponding responses to the irradiance of wavebands of 515 nm, 650 nm, and 850 nm may be obtained, respectively. When only a single-waveband narrow-band optical filter with the central wavelength of 515 nm is used, only light with the waveband of 515 nm enters the R channel, G channel, and B channel:

$$a_1 = \frac{R\_DN}{R_{515}}; b_1 = \frac{G\_DN}{R_{515}}; c_1 = \frac{B\_DN}{R_{515}}.$$

When only a single-waveband narrow-band optical filter with the central wavelength of 650 nm is used, only light with the waveband of 650 nm enters the R channel, G channel, and B channel:

$$a_2 = \frac{R\_DN}{R_{650}}; b_2 = \frac{G\_DN}{R_{650}}; c_2 = \frac{B\_DN}{R_{650}}.$$

When only a single-waveband narrow-band optical filter with the central wavelength of 850 nm is used, only light with the waveband of 850 nm enters the R channel, G channel, and B channel:

$$a_3 = \frac{R\_DN}{R_{850}}; b_3 = \frac{G\_DN}{R_{850}}; c_3 = \frac{B\_DN}{R_{850}}.$$

Through the experiments of an independent narrow-band optical filter at multiple exposure times, the response coefficient factor matrix $[a^i b^i c^i]^T$ for DN of the three channels at the three wavebands of 515 nm, 650 nm, and 850 nm at different exposure times is finally obtained, i∈[1,3], and mixed spectral decomposition models of R-650 nm, G-515 nm, and B-850 nm are obtained. After obtaining the mixed spectral decomposition model, the actual irradiance $R_{515}$, $R_{650}$, and $R_{850}$ may be calculated from DN of the R, G, and B channels by solving the response coefficient factor matrix of the mixed spectral decomposition model.

The step of "(5) . . . , acquiring spectral image reflectivity corresponding to each waveband through the incident irradiance and the acquired actual irradiance" is specifically as follows:

setting spectral image reflectivities corresponding to $\lambda_a$, $\lambda_b$, and $\lambda_c$ to be $REF_{\lambda_a}$, $REF_{\lambda_b}$, and $REF_{\lambda_c}$, and obtaining the spectral image reflectivities by the following equations:

$$REF_{\lambda_a} = \frac{R_{\lambda_a}}{R_{e\_in\_\lambda_a}}; REF_{\lambda_b} = \frac{R_{\lambda_b}}{R_{e\_in\_\lambda_b}}; REF_{\lambda_c} = \frac{R_{\lambda_c}}{R_{e\_in\_\lambda_c}}.$$

In practical application, the imaging system is mounted on a mobile carrier and may specifically be the monocular high-resolution multispectral imaging system described in embodiment 1. The imaging system is started to acquire the original image optical signal. The incident light calibration module 400 records the incident light irradiance $R_{e\_in\_515}$, $R_{e\_in\_650}$, $R_{e\_in\_850}$ and of the data acquisition point, and the imaging system and the incident light calibration module 400 are triggered by the same signal source according to a multispectral image of the measured irradiance $R_{515}$, $R_{650}$, and $R_{850}$ reflected by the target object. The spectral image reflectivities $REF_{515}$, $REF_{650}$, and $REF_{850}$ of three wavebands 515 nm, 650 nm, and 850 nm are calculated by the following equations:

$$REF_{515} = \frac{R_{515}}{R_{e\_in\_515}}; REF_{650} = \frac{R_{650}}{R_{e\_in\_650}}; REF_{850} = \frac{R_{850}}{R_{e\_in\_850}}.$$

Obviously, the foregoing embodiments of the present disclosure are merely examples for the purpose of clearly illustrating the technical solutions of the present disclosure and are not to be construed as limiting the specific implementations of the present disclosure. Any modifications, equivalents, improvements, etc. made within the spirit and principles of the claims of the present disclosure should be included within the scope of the claims of the present disclosure.

We claim:

1. A monocular high-resolution multispectral imaging system, comprising:
   an image sensor, configured to convert an optical signal of each waveband into a digital signal;
   a distortionless imaging lens, configured to focus an original image optical signal of a target object on the image sensor to generate a red-green-blue (RGB) original image;
   a multi-waveband combined narrow-band optical filter, placed between the distortionless imaging lens and the image sensor and configured to constrain a spectral range of an actual receivable optical signal of the image sensor;
   an incident light calibration module, configured to acquire incident irradiance of ambient light; and
   a parallel data processing unit, connected to the image sensor and configured to analyze the digital signal in combination with the incident irradiance and generate a reflectivity image for vegetation analysis,
   wherein the image sensor comprises three channels of R, G, and B;
   let
   a response range of the R channel be $\lambda_R \in [A_s, A_e]$;
   a response range of the G channel be $\lambda_G \in [B_s, B_e]$;
   a response range of the B channel be $\lambda_B \in [C_s, C_e]$;
   let an actual measured value of any channel be DN, wherein actual measured values of the R channel, G channel, and B channel are R_DN, G_DN, and B_DN, respectively:
   a response function of the R channel is $R\_DN = f_R(R_{\lambda_R})$;
   a response function of the G channel is $G\_DN = f_G(R_{\lambda_G})$;
   a response function of the B channel is $B\_DN = f_B(R_{\lambda_B})$;
   wherein $R_{\lambda_R}$, $R_{\lambda_G}$, and $R_{\lambda_B}$ are irradiance corresponding to $\lambda_R$, $\lambda_G$, and $\lambda_B$ wavelengths, respectively;
   the multi-waveband combined narrow-band optical filter is a three-waveband combined narrow-band optical filter;
   let
   central wavelengths of the three wavebands be $\lambda_a$, $\lambda_b$, and $\lambda_c$, respectively, and satisfy $\lambda_a < \lambda_b < \lambda_c$;
   $R_{\lambda_a}$, $R_{\lambda_b}$, and $R_{\lambda_c}$ are irradiance corresponding to $\lambda_a$, $\lambda_b$, and $\lambda_c$, respectively;
   when $R_{\lambda_a} = R_{\lambda_b} = R_{\lambda_c}$, the actual measured values of the R channel, G channel, and B channel in the image sensor satisfy:

$$f_R(R_{\lambda_a}) < f_R(R_{\lambda_c}) < f_R(R_{\lambda_b});$$

$$f_G(R_{\lambda_b}) < f_G(R_{\lambda_c}) < f_G(R_{\lambda_a});$$

$$f_B(R_{\lambda_b}) < f_B(R_{\lambda_a}) < f_B(R_{\lambda_c});$$

the imaging system is controlled by the following control method, comprising the specific steps of:
   (1) acquiring an original image optical signal entering the distortionless imaging lens;
   (2) performing combined filtering on the original image optical signal using three-waveband combined narrow-band optical filter;
   (3) after the combined filtering, focusing filtered optical signals on the image sensor of the imaging system to generate a waveband-constrained RGB original image;
   (4) converting the waveband-constrained RGB original image into a digital signal, and acquiring actual irradiance corresponding to each waveband; and
   (5) acquiring incident irradiance of ambient light, and acquiring spectral image reflectivity corresponding to each waveband through the incident irradiance and the acquired actual irradiance,
   wherein in the step of "(2) performing combined filtering on the original image optical signal using three-waveband combined narrow-band optical filter", after the combined filtering, DN values of the waveband-constrained RGB original image received by the R channel, G channel, and B channel are R_DN, G_DN, and B_DN, respectively;
   the irradiance corresponding to the central wavelengths of the wavebands $\lambda_a$, $\lambda_b$, and $\lambda_c$ are $R_{\lambda_a}$, $R_{\lambda_b}$, and $R_{\lambda_c}$, respectively;
   the following relationships are required:

$$R\_DN = a_1 \times R_{\lambda_a} + a_2 \times R_{\lambda_b} + a_3 \times R_{\lambda_c};$$

$$G\_DN = b_1 \times R_{\lambda_a} + b_2 \times R_{\lambda_b} + b_3 \times R_{\lambda_c};$$

$$B\_DN = c_1 \times R_{\lambda_a} + c_2 \times R_{\lambda_b} + c_3 \times R_{\lambda_c};$$

that is:

$$\begin{bmatrix} R\_DN \\ G\_DN \\ B\_DN \end{bmatrix} = \begin{bmatrix} a_1 & a_2 & a_3 \\ b_1 & b_2 & b_3 \\ c_1 & c_2 & c_3 \end{bmatrix} \cdot \begin{bmatrix} R_{\lambda_a} \\ R_{\lambda_b} \\ R_{\lambda_c} \end{bmatrix},$$

wherein $a_1$, $a_2$, and $a_3$ are response coefficient factors of the R channel, $b_1$, $b_2$, and $b_3$ are response coefficient factors of the G channel, and $c_1$, $c_2$, and $c_3$ are response coefficient factors of the B channel:

a response coefficient factor matrix is acquired:

$$\begin{bmatrix} a_1 & a_2 & a_3 \\ b_1 & b_2 & b_3 \\ c_1 & c_2 & c_3 \end{bmatrix},$$

wherein the step of "(4) . . . , acquiring actual irradiance corresponding to each waveband" is specifically as follows: calculating $R_{\lambda_a}$, $R_{\lambda_b}$, and $R_{\lambda_c}$ by the response coefficient factor matrix and R_DN, G_DN, and B_DN;

the step of "a response coefficient factor matrix is acquired" is specifically as follows:

after the steps of "(1) acquiring an original image optical signal of the target object entering the distortionless imaging lens" and "(2) performing combined filtering on the original image optical signal using three-waveband combined narrow-band optical filter", adding three single-waveband filters in front of the three-waveband combined narrow-band optical filter in sequence, and the central wavelength of single-waveband filter is consistent with one of the wavelengths of three-waveband combined narrow-band optical filter;

in the single-waveband filters, let the central wavelengths of the adopted wavebands be $\lambda_{sa}$, $\lambda_{sb}$, and $\lambda_{sc}$, respectively, and satisfy $\lambda_{sa}=\lambda_a$, $\lambda_{sb}=\lambda_b$, and $\lambda_{sc}=\lambda_c$;

when only the single-waveband filter with the central wavelength of $\lambda_{sa}$ is added to obtain:

$$a_1 = \frac{R\_DN}{R_{\lambda_a}}; b_1 = \frac{G\_DN}{R_{\lambda_a}}; c_1 = \frac{B\_DN}{R_{\lambda_a}};$$

when only the single-waveband filter with the central wavelength of $\lambda_{sb}$ is added to obtain:

$$a_2 = \frac{R\_DN}{R_{\lambda_b}}; b_2 = \frac{G\_DN}{R_{\lambda_b}}; c_2 = \frac{B\_DN}{R_{\lambda_b}};$$

when only the single-waveband filter with the central wavelength of $\lambda_{sc}$ is added to obtain:

$$a_3 = \frac{R\_DN}{R_{\lambda_c}}; b_3 = \frac{G\_DN}{R_{\lambda_c}}; c_3 = \frac{B\_DN}{R_{\lambda_c}};$$

the response coefficient factor matrix is thus acquired.

2. The monocular high-resolution multispectral imaging system according to claim 1, further comprising:
a self-stabilizing gimbal, configured to control the distortionless imaging lens to be directed towards a shooting target in real time;
a positioning module, configured to acquire shot geographical location information and a course angle; and
a data storage device, configured to store the RGB original image, the geographical location information, and the course angle,
wherein the distortionless imaging lens, the multi-waveband combined narrow-band optical filter, the image sensor, the incident light calibration module, the parallel data processing unit, the positioning module, and the data storage device are provided on the self-stabilizing gimbal;
the positioning module is connected to the parallel data processing unit;
a coordinate center of the image sensor vertically coincides with a geometric center of an antenna of the positioning module.

3. The control method of the monocular high-resolution multispectral imaging system according to claim 1, wherein before the step of "(1) original image optical signal of the target object entering the distortionless image lens", the control method further comprises the steps of:
calibrating the imaging system specifically as follows:
1) Adjusting the field of view of the imaging system so that the field of view is completely within a standard reflector;
2) Applying a uniform light source to the standard reflector and adjusting the illumination intensity, and continuously performing interval acquisition, by the imaging system, on the standard reflector to acquire a certain amount of RGB original images;
3) Assuming the image resolution of the imaging system to be A×B and X to be coordinates of a pixel, X=[x, y], wherein x∈[1, A], y∈[1, B];
4) Acquiring irradiance corresponding to pixels in each RGB original image;
5) Acquiring an attenuation coefficient ax of each pixel through a difference in irradiance between a center and other pixels in each RGB original image;
6) Training each pixel through the change of the certain amount of RGB original images, and setting a DN value corresponding to the center of the RGB original image to be $DN_p$ and a DN value corresponding to other pixels of the RGB original image to be $DN_X$; and
7) The attenuation coefficient of each pixel satisfying $$a_X = \frac{DN_X}{DN_p};$$

after the step of "(4) converting the waveband-constrained RGB original image into a digital signal", the control method further comprises: performing correction on the pixels in the waveband-constrained RGB original image,
wherein after correction, a DN value corresponding to the irradiance of other pixels except the center is $$DN_{RX}, DN_{RX} = \frac{DN_X}{a_X}.$$

4. The control method of the monocular high-resolution multispectral imaging system according to claim 3, wherein the step of "2) applying a uniform light source to the standard reflector and adjusting the illumination intensity" is specifically as follows:
(a) directing the standard reflector to the light source;
(b) aligning the imaging system with the standard reflector during orthophoto; and
(c) simulating a light environment actually used by the imaging system through a light source passing position and regular changes of brightness.

5. The control method of the monocular high-resolution multispectral imaging system according to claim 1, wherein the step of "(5) acquiring incident irradiance of ambient light, . . . " is specifically as follows:

acquiring the incident irradiance of the ambient light using an incident light calibration module, wherein the incident light calibration module comprises three spectral channels, and central wavelengths of the three spectral channels are $\lambda_{ka}$, $\lambda_{kb}$, and $\lambda_{kc}$, respectively, and satisfy:

$\lambda_{ka}=\lambda_a, \lambda_{kb}=\lambda_b, \lambda_{kc}=\lambda_c$;

let $V_{out\_in}$ be an output voltage of the spectral channel, $R_e$ be the sensitivity of a photosensitive element corresponding to a specific wavelength, $R_{e\_in}$ be the incident irradiance of the spectral channel, and $t_{in}$ be the integration time;

the incident irradiance $R_{e\_in}$ of the three spectral channels of the incident light calibration module is acquired by the following equation:

$$R_{e\_in} = \frac{V_{out\_in}}{R_e \times t_{in}}.$$

6. The control method of the monocular high-resolution multispectral imaging system according to claim 1, wherein the step of "(5) . . . , acquiring spectral image reflectivity corresponding to each waveband through the incident irradiance and the acquired actual irradiance" is specifically as follows:

setting spectral image reflectivities corresponding to $\lambda_a$, $\lambda_b$, and $\lambda_c$ to be $REF_{\lambda_a}$, $REF_{\lambda_b}$, and $REF_{\lambda_c}$, and obtaining the spectral image reflectivities by the following equations:

$$REF_{\lambda_a} = \frac{R_{\lambda_a}}{R_{e\_in\_\lambda_a}}; REF_{\lambda_b} = \frac{R_{\lambda_b}}{R_{e\_in\_\lambda_b}}; REF_{\lambda_c} = \frac{R_{\lambda_c}}{R_{e\_in\_\lambda_c}}.$$

\* \* \* \* \*